United States Patent [19]

Talbott et al.

[11] 4,113,812

[45] Sep. 12, 1978

[54] METHOD OF FORMING A COMPOSITE MAT OF DIRECTIONALLY ORIENTED LIGNOCELLULOSIC FIBROUS MATERIAL

[75] Inventors: John W. Talbott, Moscow, Id.; James D. Logan, Pullman, Wash.

[73] Assignee: Washington State University Research Foundation, Pullman, Wash.

[21] Appl. No.: 747,391

[22] Filed: Dec. 3, 1976

[51] Int. Cl.[2] ................................................ B29J 5/00

[52] U.S. Cl. ........................................ 264/24; 264/91; 264/108; 264/121; 425/174.8 E

[58] Field of Search .................... 264/24, 91, 108, 121; 425/174.8 E

[56] References Cited

U.S. PATENT DOCUMENTS 3,843,765 10/1974 Talbott et al. ......................... 264/24

FOREIGN PATENT DOCUMENTS 976,840 6/1964 Fed. Rep. of Germany.

OTHER PUBLICATIONS

Stofko, J., "Orientation of Wood Particles in an Electrostatic Field", 8-1965.

*Primary Examiner*—Jan H. Silbaugh
*Attorney, Agent, or Firm*—Wells, St. John & Roberts

[57] ABSTRACT

The description describes a process for forming a composite mat of directionally oriented lignocellulosic material in which elongated small pieces of the material are caused to descend individually as separate and discrete objects through an electric field orienting zone. A horizontal mat-support surface is moved immediately below the orienting zone to receive the descending pieces thereon with the elongated pieces overlapping each other to form a composite mat. An electric current is passed through the mat to produce a directional electric field immediately above the mat in which the electric field is directed in the direction of movement of the mat and parallel with the mat to exert forces on the elongated small pieces to cause the pieces to orient their long dimensions in the direction of the electric field as the pieces descend through the orienting zone in the formation of the composite mat. The electric current is produced within the mat by contacting the mat with electrodes and applying a voltage difference between the electrodes to cause electric current to flow through the mat between the electrodes in the direction of mat travel.

10 Claims, 7 Drawing Figures

FIG. 4
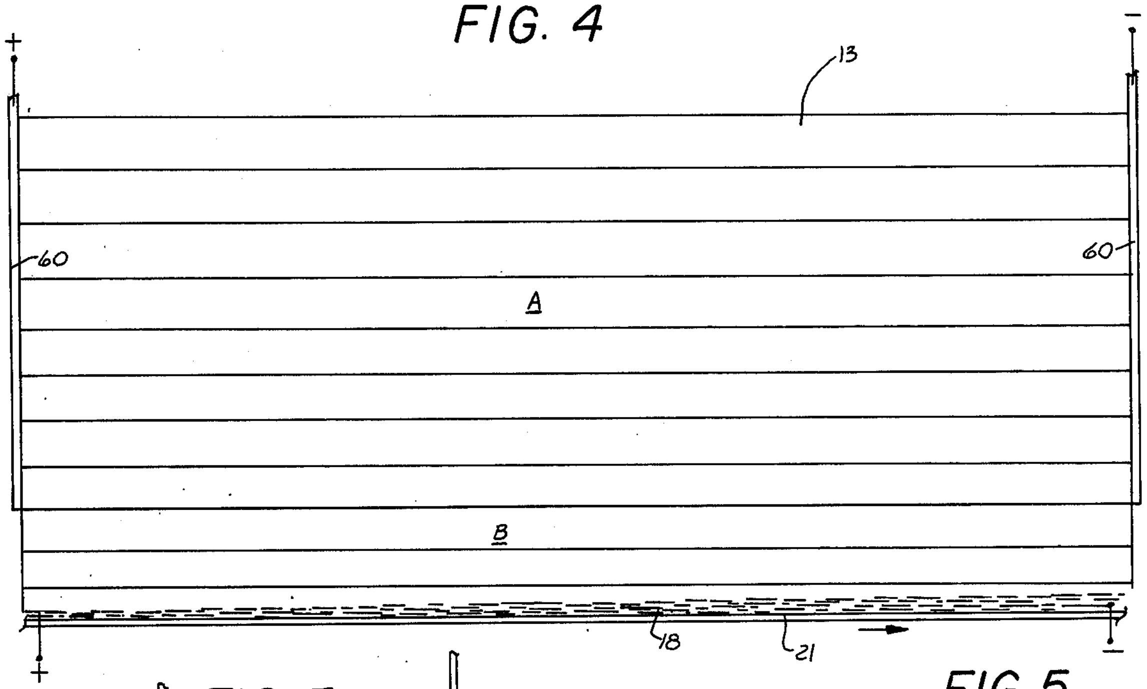
FIG. 3
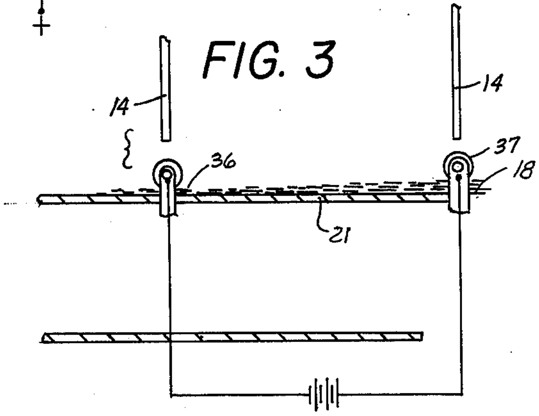
FIG. 5
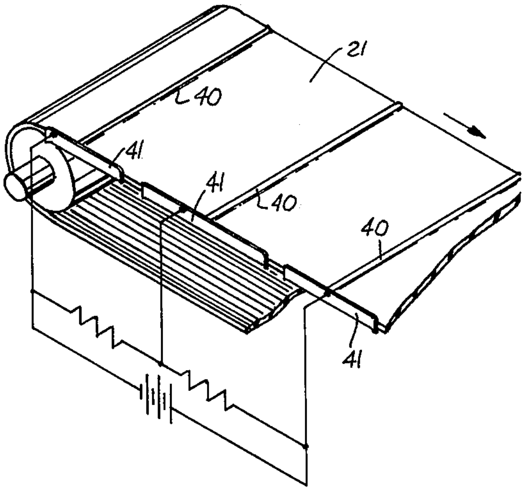
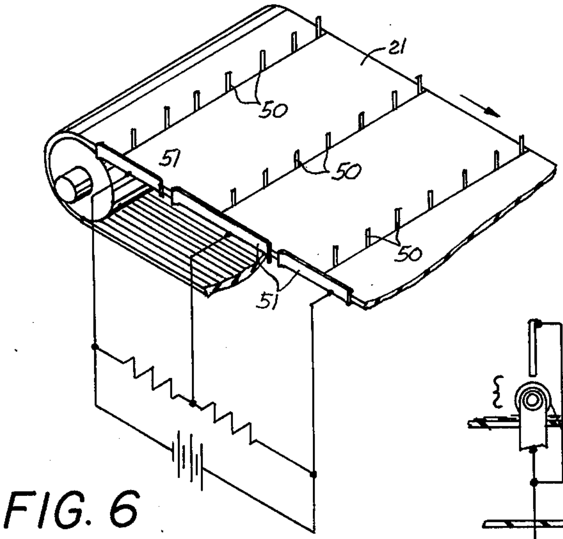
FIG. 6
FIG. 7
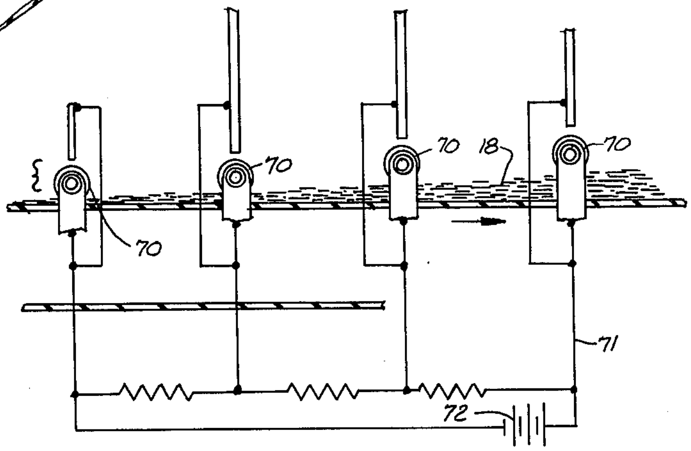

METHOD OF FORMING A COMPOSITE MAT OF DIRECTIONALLY ORIENTED LIGNOCELLULOSIC FIBROUS MATERIAL

BACKGROUND OF THE INVENTION

This invention relates to processes for forming panels, boards, or other like products having directional strength properties and more particularly to that portion of the process of forming a mat of oriented small pieces of lignocellulosic material prior to pressing the mat to form a reconstituted product.

It has been known for some time that advantageous directional properties may be obtained by directionally orienting the elongated small pieces of the lignocellulosic material in a desired direction as opposed to randomly orienting the pieces. A considerable amount of research has been conducted to develop commercially attractive techniques for directionally orienting the elongated small pieces during the formation of the mat. Most of the research has been directed along two avenues — (1) mechanical orientation, and (2) electrical orientation.

At the present time reconstituted wood panels are being formed for the commercial market utilizing mechanical orientation of the elongated small pieces.

Our initial research indicated to us that it was feasible to eletrostatically orient small elongated lignocellulosic pieces in a strong electric field on a batch basis. A product of commercial quality could be formed utilizing the batch system which is described in our U.S. Pat. No. 3,843,756 granted to Talbott et al on Oct. 22, 1974. FIG. 5 of that patent shows a technique for forming an oriented mat on a continuous basis. Although during our experimentation we found that electrical orientation could be obtained on a continuous basis we were unable to obtain a commercially acceptable product. We found that the orientation results were somewhat erratic and that our good results which we had obtained utilizing the batch system could not be obtained when we went to a continuous system.

We were mystified as to why good results could be obtained in a batch system but that disappointing results were obtained in a continuous system. We initially experimented with the placement of a set of secondary electrode plates into the vacuum box below the moving mat in an attempt to obtain better orientation. However, even the addition of the secondary electrodes below the mat did not bring the continuous process up to our expectations.

Thus one of the principal objects of this invention is to provide a solution to the problem and provide a commercially attractive process for forming an oriented continuous mat of lignocellulosic material utilizing an electric field.

An additional object of this invention is to provide a process for forming a continuous mat of small pieces of lignocellulosic material having uniform orientation in the length direction of the mat.

A further object of this invention is to provide a process for forming a continuous mat of oriented small pieces of lignocellulosic material that is economical and reliable.

These and other objects and advantages of this invention will be apparent upon reading the following description of preferred and alternate embodiments of this invention.

BRIEF DESCRIPTION OF THE DRAWINGS

Preferred and alternate embodiments of this invention are illustrated in the accompanying drawings, in which:

FIG. 3 is a diagrammatic view of a vertical section of apparatus for generating an electric field according to the principals of this invention;

FIG. 4 is a graphic representation of the lines of force of the electric field generated by the application of this invention for orienting the small pieces of lignocellulosic material;

FIG. 5 is a diagrammatic isometric view of alternate apparatus for generating the electric field of the present invention;

FIG. 6 is a diagrammatic isometric view of alternate apparatus for generating the electric field of the present invention; and FIG. 7 is a diagrammatic view of a vertical section of alternate apparatus for forming a generally thicker mat utilizing the principles of this invention.

DETAILED DESCRIPTION OF THE INVENTION AND PREFERRED AND ALTERNATE EMBODIMENT

A more detailed explanation of the prior art process described in U.S. Pat. No. 3,843,756 is useful for full understanding of this invention.

Figure 1:
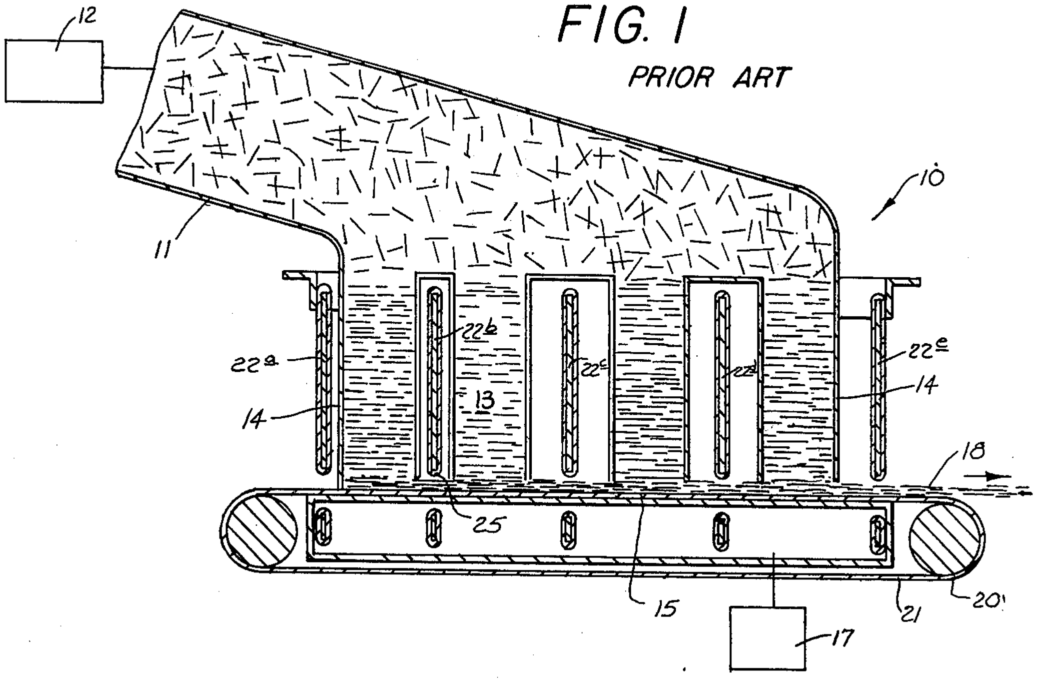
FIG. 1 PRIOR ART
FIG. 1 is a diagrammatic view of a vertical section of apparatus for performing a prior art process utilizing an electric field for orienting small lignocellulosic pieces.

The prior art process was developed utilizing apparatus illustrated in FIG. 1. The apparatus includes a continuous mat former 10 having an intake manifold 11 with means 12 for feeding the small pieces to the mat former in which the pieces are fed as discrete and independent pieces entrained in an air carrier medium. The mat former includes an orientation zone 13 that is enclosed by side walls 14. The side walls extend downwardly to a horizontal moving mat-support surface 15. A vacuum means 17 is provided below the mat-support surface to draw the air downward through the mat-support surface to cause the particles to descend upon the mat-support surface and overlap each other to form a composite mat 18. The mat-support surface 15 is usually provided as the top flight of a continuous conveyor 20 having an air pervious continuous belt 21. The prior art apparatus included spaced electrodes 22 a-e that are positioned above the moving mat-support surface 15 to provide a gap 25 between the electrodes and the mat-support surface 15 to enable the formed mat to pass beneath the electrodes. A high voltage generating means (not shown) is connected to the electrodes to develop a strong electric field between the electrodes for orienting the small pieces as they descend through the orientation zone. The zone 13 shown in more detail in FIG. 2 has two regions. Region A exists between the top of the electrodes and the bottom of the electrodes 22. Region B exists from the bottom of the electrodes to the mat-support surface 15.

Figure 2:
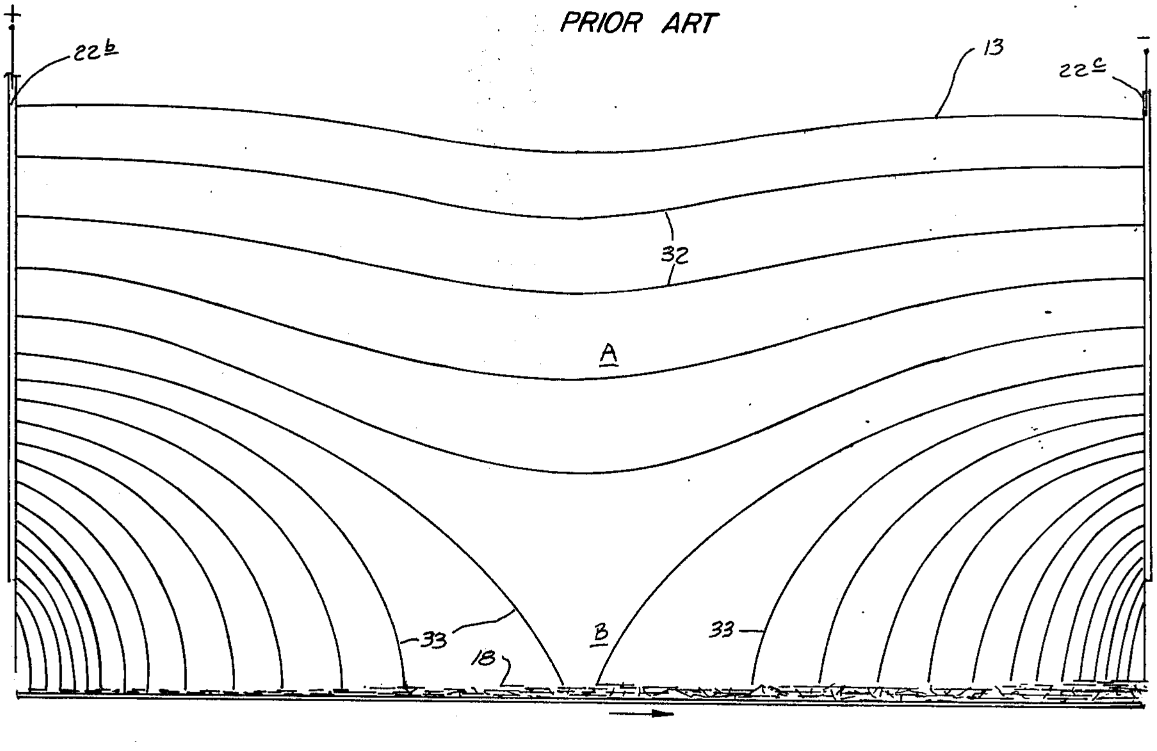
FIG. 2 PRIOR ART
FIG. 2 is a graphic representation of the lines of electric force of the electric field generated within an orienting zone by the prior art process performed by the apparatus illustrated in FIG. 1.

We have found that the prior art process for forming a continuous oriented mat of commercial quality is questionable. We discovered that the electric field changed considerably in Region B from what had been anticipated. We found that the electric field instead of being truly uniform and horizontal throughout the entire orientation zone 13, changed drastically in Region B as indicated in FIG. 2. In Region A the lines of force 32 were substantially horizontal providing for good orientation. However, when the small pieces descended from Region A into Region B the lines of force 33 departed drastically from a horizontal orientation tending more to align in the vertical direction substantially hindering or rendering ineffective the horizontl orientation in the plane of the mat.

Quite by accident we discovered that the composite mat 18 in effect short-circuited the electric field immediately above the mat surface causing the pieces to orient themselves vertically, landing in random orientation rather than in the direction of mat movement as we had previously anticipated.

We discovered that by passing an electric current through the mat 18 itself that a directional electric field in the direction of movement of the mat would be developed to effectively orient the small particles in the plane of the mat and in the direction of the travel of the mat to obtain good reliable orientation.

In the broadest aspect of our invention we provide a method of forming a composite mat of directionally oriented lignocellulosic material comprising the steps of (1) causing the elongated small pieces of lignocellulosic material (6% to 20% moisture) to individually descend as separate, discrete objects through an orienting zone; (2) moving a horizontal mat-support surface immediately below the orienting zone to receive the descending pieces thereon with the elongated pieces overlapping each other to form a composite mat; and (3) forcing an electric current to flow within the mat to produce a directional electric field immediately above the mat in the orienting zone in which the electric field is substantially parallel with the mat-support surface and directed in the direction of the movement of the mat-support surface.

The electric field tends to orient the elongated small pieces in the direction of the electric field as the pieces descend through the orienting zone in the formation of the composite mat. Such a process enables one to develop a uniform horizontal electric field throughout the entire orienting zone (FIG. 4) including Region B immediately above the mat surface to obtain commercially acceptable results.

This process is directed to the directional orientation of small lignocellulosic pieces such as flakes, strands, chips, shavings, slivers, fibers and similar forms that are produced by cutting, hammermilling, grinding and similar processes. The principal requirement is that the small pieces be elongated in the direction of the material grain or fiber in which the major dimension is many times greater than the thickness and greater than at least two times the width. Preferably each elongated piece should be more than ten times longer than the thickness.

Furthermore the electrical properties of the lignocellulosic material vary greatly with the moisture content of the material. We have found that for best results, the material should have a moisture content of between 6% and 20% on a dry weight basis. The percentage of moisture in the material calculated on a dry weight basis is defined as the wet weight minus the dry weight divided by the dry weight of the material, times 100.

Although the immediate commercial application of the process is directed to the wood industry, other types of lignocellulosic material may be utilized to form composite mats to be utilized in manufacturing reconstructed panels or articles. Other types of natural material that may be utilized depending upon their commercial availability and desirability in finished products include bark, straw, grass, bagasse and similar fibrous material.

It is preferable in the practice of this invention that the electric current density through the mat be rather uniform. This may be achieved by applying a uniform voltage gradient to the mat in the direction of the mat-support movement to produce the uniform directional electric field immediately above the mat.

In a preferred form the uniform voltage gradient is provided by contacting the mat with electrodes at uniformly spaced locations and applying voltages between the uniformly spaced electrodes to cause electric current to flow in the mat between the electrodes in the direction of the mat-support surface movement to develop the uniform horizontal electric field parallel with the mat surface.

One embodiment of this invention includes the application of electrodes which contact the top surface of the mat at uniformly spaced locations to cause electric current to flow through the mat between the electrodes (FIG. 4 and 7). A second embodiment includes contacting the bottom surface of the mat by providing electrodes on the mat support surface (FIG. 5).

A third embodiment includes providing electrically conductive projections or finger-like electrodes that are affixed to the mat-support surface and extend upwardly into the mat and downwardly through the mat-support surface (FIG. 6).

The magnitude of the electric voltage that is to be applied between the electrodes varies with the type of material, its shape and size, its moisture content, its weight and various other factors including the former configuration, the air flow rate and the conveyor speed. Preferably the applied voltage gradient is between 1 kilovolt and 10 kilovolts per linear inch of mat surface in the direction of mat travel. If the spacing between the electrodes in the direction of mat travel is ten inches then the voltage applied to the electrodes should be between 10 kilovolts and 100 kilovolts.

The frequency of the voltage to be applied to the electrodes is dependent upon many of the factors relating to voltage magnitude. We have found that generally best results are obtained utilizing a voltage frequency of between 0 and 60 Hz inclusive.

A further embodiment of this invention is to provide a second electric field above the first electric field as shown in FIGS. 4 and 7 to develop a vertically extended uniform horizontal electric field having additional depth.

The broad aspect of our invention may be carried out in apparatus illustrated in FIG. 3 in which electrodes 36 and 37 are provided in contact with the mat itself at spaced locations in the direction of movement of the mat-support surface 15 and applying voltage between electrodes as above described, to cause an electric current to flow in the mat between electrodes. The flowing electric current in turn produces a directional electric field in the direction of movement of the mat. The directional electric field causes the descending small pieces to orient themselves in the desired direction in the plane of the mat. In FIG. 3 electrode 36 is a conductive roller electrode that extends transversely immediately above the belt 21 to contact the mat. Electrode 37 includes an electrically conductive roller that is in physical contact with the top surface of the mat. Voltage is applied between the electrodes 36 and 37 to cause electric current to flow in the mat between the electrodes 36 and 37 in the direction of movement of the belt 21, and thereby establish a uniform horizontally-directed electric field immediately above the top surface of the mat as illustrated in FIG. 4.

In lieu of or in addition to the electrodes 36 and 37 the belt 21 may be provided with electrodes 40 that are affixed to the belt 21 at longitudinally spaced locations. The electrodes 40 extend transversely across the belt 21 and, when in the upper flight of the conveyor, physically contact the bottom surface of the mat. Electrical voltages may be applied to the electrodes by various techniques. FIG. 5 shows electrical brushes 41 positioned alongside the upper flight of the belt to electrically contact the electrodes 40. Various electrical circuits may be utilized to apply an approximately uniform voltage gradient to the mat.

An alternative technique of applying the electrical voltage to the mat is to provide electrically conductive projections or finger-like electrodes 50 on the belt 21 as illustrated in FIG. 6 so that the finger-like electrodes extend upward into the interior of the mat to physically contact the mat material. Likewise brush commutators 51 may be utilized to apply the voltage to the electrodes. Various other types of techniques may be utilized for electrically contacting the mat material as the mat is being formed to apply voltage to cause an electric current to flow in the mat in the direction of mat travel, and thereby establish a uniform horizontally-directed electric field immediately above the top surface of the mat as illustrated in FIG. 4.

In many applications, it may be desirable to expose the descending small pieces of lignocellulosic material to an electric field of considerably greater depth than the field produced only by the current flowing through the mat. Consequently it is contemplated that additional electrodes will be placed above the mat much in the same manner as the prior art apparatus illustrated in FIG. 1 for creating a second electric field to integrate and complement the field immediately above the mat surface.

FIG. 4 illustrates graphically the integration of both electric fields in the orientation zone 13. FIG. 4 shows the positioning of electrodes 60 above the mat spaced in the direction of travel of the mat for producing a second directional electric field in Region A that is complementary in magnitude and direction to the electric field in Region B produced by the electric current passing through the mat. It should be noted that the lines of force in both Regions A and B are substantially parallel to each other and parallel to the mat surface to provide an approximately uniform horizontal field throughout the orienting zone 13.

The mat 18 may be built to any desired thickness by utilizing several series-positioned forming chambers having a plurality of spaced electrodes 70 in contact with the mat surface. An electrical circuit 71 is connected to a high voltage electrical source 72 for applying an appropriate voltage between adjacent electrodes 70. A second set of electrodes 80 may be positioned above the mat for extending the vertical depth of the orienting zone 13 above the mat to increase the residence time that each small piece is subjected to the orienting electric field forces. A voltage is applied between the second set of electrodes 70 to produce an electric field in the upper portion of the orienting zone equal in direction and magnitude to the electric field produced by voltage applied to the mat.

These and other embodiments may be readily devised by those skilled in the art without deviating from the principle of our invention. Therefore only the following claims are intended to define our invention.

What we claim is:

1. A method of forming a continuous composite mat of directionally oriented lignocellulosic fibrous material, comprising the steps of:

causing a multitude of elongated small pieces of lignocellulosic fibrous material to individually descend as separate and discrete objects into an orienting zone;

said elongated small pieces having a dry weight moisture content of between six percent and twenty percent, with their major dimension along the fiber direction;

moving a horizontal mat-support surface immediately below the orienting zone to receive the descending pieces thereon with the elongated pieces overlapping each other to form a continuous mat;

causing an electric current to flow within the continuous mat to produce a directional electric field immediately above the mat in the orienting zone in which the electric field is substantially parallel with the mat-support surface within the orienting zone and directed in the direction of movement of the mat-support surface tending to orient the longer dimension of the elongated small pieces in the direction of the electric field as the pieces descend through the orienting zone.

2. The method as defined in claim 1 wherein the electric current within the mat is generated by applying a uniform voltage gradient in the direction of the mat-support surface movement to produce a uniform directional electric field immediately above the mat tending to uniformly orient the elongated small pieces in the direction of the electric field as the pieces descend through the orienting zone.

3. The method as defined in claim 2 wherein the uniform voltage gradient is produced by (1) providing the mat-support surface with a plurality of spaced electrodes in electrical contact with the mat and (2) applying voltages between adjacent electrodes to cause electric current to flow in the mat between electrodes in the direction of mat-support surface movement, and thereby produce the desired orienting electric field.

4. The method as defined in claim 2 wherein the uniform voltage gradient is produced by providing the mat-support surface with a plurality of spaced parallel electric conductors that extend across the mat-support surface transverse to the direction of movement of the mat-support surface and in electrical contact with the mat and applying voltages between adjacent conductive wires to cause electric current to flow in the mat between the wires.

5. The method as defined in claim 1 wherein the electric current is generated by (1) electrically contacting the mat at spaced locations in the direction of movement of the mat-support surface, and (2) applying voltage between the spaced locations to cause electrical current to flow in the mat between the electrodes to produce the desired directional electric field immediately above the mat surface.

6. The method as defined in claim 1 wherein the electric current is generated by (1) electrically contacting the top surface of the mat with electrodes spaced in the direction of movement of the mat-support surface and (2) applying voltage between the electrodes to produce the desired directional electrical field immediately above the mat surface.

7. The method as defined in claim 6 wherein at least one of the electrodes is an electrically conductive roller in electrical contact with the top surface of the mat.

8. The method as defined in claim 2 wherein the uniform voltage gradient is between 1 kv and 10 kv per inch of mat surface in the direction of mat travel.

9. The method as defined in claim 1 further comprising the step of establishing a second directional electric field above the first directional electric field through which the small elongated pieces descend to cause the pieces to be at least partially aligned in the direction of travel of the mat before the pieces descend into the first directional electric field.

10. The method as defined in claim 9 wherein the second directional electric field is generated by placing electrodes above the mat surface and spaced in the direction of travel of the mat and applying a second voltage between the electrodes to produce an electric field in the upper portions of the orienting zone equal in magnitude and direction to the first electric field to at least partially align the pieces before reaching the region of influence of the first electric field.

* * * * *